(12) United States Patent
Shao et al.

(10) Patent No.: US 6,280,663 B1
(45) Date of Patent: Aug. 28, 2001

(54) PROCESS OF MAKING PINS FOR CONNECTING CARBON ELECTRODES

(75) Inventors: Richard Liichang Shao, North Royalton; James William Kortovich, Strongsville; Irwin Charles Lewis, Strongsville; Richard Thomas Lewis, Strongsville, all of OH (US)

(73) Assignee: UCAR Carbon Company Inc., Nashville, TN (US)

( * ) Notice: Subject to any disclaimer, the term of this patent is extended or adjusted under 35 U.S.C. 154(b) by 0 days.

(21) Appl. No.: 09/514,219

(22) Filed: Feb. 25, 2000

(51) Int. Cl.$^7$ .................................... C01B 31/04
(52) U.S. Cl. .................. 264/29.7; 264/211.11; 423/448
(58) Field of Search ............... 264/29.7, 211.11; 423/448

(56) References Cited

U.S. PATENT DOCUMENTS 3,658,476 * 4/1972 Trask et al. ..................... 423/448
4,005,183   1/1977 Singer .
4,017,327   4/1977 Lewis .
4,998,709   3/1991 Griffin .

FOREIGN PATENT DOCUMENTS 1526809   10/1978 (GB) .

\* cited by examiner

*Primary Examiner*—Leo B. Tentoni
(74) *Attorney, Agent, or Firm*—James R. Cartiglia

(57) ABSTRACT

A process for preparing pins for connecting carbon electrodes is presented. In particular, a process for preparing pins for connecting carbon electrodes including the steps of combining calcined coke, a liquid pitch binder and carbon fibers derived from mesophase pitch to form a pinstock blend; extruding the pinstock blend to form a green pinstock; baking the green pinstock to form a carbonized pinstock; and graphitizing the carbonized pinstock by maintaining the carbonized pinstock at a temperature of at least about 2500° C. for no more than about 18 hours is presented. The pins prepared by the inventive process are also presented.

16 Claims, No Drawings

PROCESS OF MAKING PINS FOR CONNECTING CARBON ELECTRODES

TECHNICAL FIELD

The present invention relates to a pin for connecting carbon electrodes, and a process for preparing the inventive pin. More particularly, the invention concerns a pin for connecting carbon electrodes, such as graphite electrodes, formed by processing a blend of calcined coke, pitch and carbon fibers derived from mesophase pitch.

BACKGROUND ART

Carbon electrodes, especially graphite electrodes, are used in the steel industry to melt the metals and other ingredients used to form steel in electrothermal furnaces. The heat needed to melt metals is generated by passing current through a plurality of electrodes, usually three, and forming an arc between the electrodes and the metal. Currents in excess of 100,000 amperes are often used. The resulting high temperature melts the metals and other ingredients. Generally, the electrodes used in steel furnaces each consist of electrode columns, that is, a series of individual electrodes joined to form a single column. In this way, as electrodes are depleted during the thermal process, replacement electrodes can be joined to the column to maintain the length of the column extending into the furnace.

Generally, electrodes arc joined into columns via a pin (sometimes referred to as a nipple) that functions to join the ends of adjoining electrodes. Typically, the pin takes the form of opposed male threaded sections, with at least one end of the electrodes comprising female threaded sections capable of mating with the male threaded section of the pin. Thus, when each of the opposing male threaded sections of a pin are threaded into female threaded sections in the ends of two electrodes, those electrodes become joined into an electrode column. Commonly, the joined ends of the adjoining electrodes, and the pin therebetween, are referred to in the art as a joint.

Given the extreme thermal stress that the joint (and indeed the electrode column as a whole) undergoes, mechanical factors such as thermal expansion must be carefully balanced to avoid damage or destruction of the electrode column or individual electrodes. For instance, longitudinal (i.e., along the length of the pin/electrode/electrode column) thermal expansion of the pin, especially at a greater rate than that of the electrodes, can force the joint apart, reducing effectiveness of the electrode column. A certain amount of transverse (i.e., across the diameter of the pin/electrode/electrode column) thermal expansion of the pin in excess of that of the electrodes may be desirable to form a firm connection between pin and electrode; however, if the transverse thermal expansion of the pin greatly exceeds that of the electrode, damage to the electrode may result, in the form of cracking or splitting. Again, this can result in reduced effectiveness of the electrode column, or even destruction of the column if the damage is so severe that a joint fails. Thus, control of the thermal expansion of a pin, in both the longitudinal and transverse directions, is of paramount importance.

There have been references to the use of mesophase pitch-based carbon fibers to improve specific properties of bulk graphite products such as electrodes. For instance, Singer, in U.S. Pat. No. 4,005,183, describes the production of mesophase pitch-based fibers and states that, because of their low electrical resistivity, these fibers can be employed as filler material in the production of graphite electrodes. In British Patent 1,526,809 to Lewis and Singer, 50% to 80% by weight of carbon fibers are added to 20% to 50% by weight of pitch binder and then extruded to form a carbon artifact that can be graphitized. The resulting article exhibits relatively low longitudinal thermal expansion.

In U.S. Pat. No. 4,998,709, Griffin et al. attempt to address the problems caused by excessive longitudinal thermal expansion of electrode pins by preparing a graphite nipple (i.e., pin) with mesophase pitch-based carbon fibers included in the extrusion blend. The carbon fibers used by Griffin et al. have a Young's modulus of greater than $55 \times 10^6$ pounds per square inch (psi), and are present in the blend at about 8 to 20 weight percent. The blend is extruded, baked, and then graphitized for from about 5 to 14 days to produce the nipple. Although nipples produced by the Griffin et al. process show a decrease in the coefficient of thermal expansion (CTE) in the longitudinal direction, they also show an undesirable increase in CTE in the transverse direction, an increase in electrical resistivity and a decrease in the modulus of rupture. In addition, the graphitizing time is extremely long compared with times that would be advantageous for commercial production.

What is desired, therefore, is a pin for connecting carbon electrodes, the pin having reduced CTE in the longitudinal direction as compared with art-conventional pins, without sacrificing transverse CTE or resistivity and modulus of rupture. Especially desirable is such a pin that is prepared by a process that does not require 5 days of graphitization. It is also highly desirable to achieve these property benefits without using high quantities of expensive materials.

SUMMARY OF THE INVENTION

It is an object of the present invention to provide a process for preparing pins for connecting carbon electrodes.

It is another object of the present invention to provide a process for preparing pins for connecting carbon electrodes, the pins having reduced longitudinal coefficient of thermal expansion as compared to art-conventional pins.

It is yet another object of the present invention to provide a process for preparing pins for connecting carbon electrodes, the pins having reduced longitudinal coefficient of thermal expansion as compared to art-conventional pins, without substantial sacrifice of transverse CTE or resistivity while also increasing the modulus of rupture.

It is still another object of the present invention to provide a process for preparing pins for connecting carbon electrodes, the pins having reduced longitudinal coefficient of thermal expansion as compared to art-conventional pins, wherein the process requires graphitization times significantly shorter than 5 days.

These objects and others that will become apparent to the artisan upon review of the following description can be accomplished by providing a process for preparing pins for connecting carbon electrodes, the process including combining calcined coke, a liquid pitch binder and carbon fibers derived from mesophase pitch to form a pinstock blend; extruding the pinstock blend to form a green pinstock; baking the green pinstock to form a carbonized pinstock; and graphitizing the carbonized pinstock by heating to a temperature of at least about 2500° C. and maintaining it at that temperature for no more than about 18 hours.

In the inventive process, the carbon fibers are preferably present at a level of about 0.5 to about 5 parts by weight of carbon fibers per 100 parts by weight of calcined coke, or at about 0.4% to about 4.0% by weight of the total mix components, have a Young's modulus after graphitization of no more than about $40\times10^6$ psi, an average diameter of about 6 to about 15 microns, and a length of about ⅙ inch to about 1 inch. Most advantageously, the carbon fibers are added to the pinstock blend as bundles, each bundle containing from about 2000 to about 20,000 fibers. The baking of the green pinstock preferably takes place at a temperature of up to about 700 to about 1000°C. in a non-oxidizing or reducing environment, and graphitization is more preferably at a temperature of from about 2500 to about 3400° C.

DETAILED DESCRIPTION OF THE PREFERRED EMBODIMENT

As noted above, pins for connecting graphite electrodes can be fabricated by first combining calcined coke, pitch and mesophase pitch-based carbon fibers into a pinstock blend. More specifically, crushed, sized and milled calcined petroleum coke is mixed with a coal-tar pitch binder to form the blend. The particle size of the calcined coke is selected according to the end use of the electrode, and is within the skill in the art. Generally, in graphite electrodes for use in processing steel, particles up to about 25 millimeters (mm) in average diameter are employed in the blend. Other ingredients that may be incorporated into the blend at low levels include iron oxides to inhibit puffing (caused by release of sulfur from its bond with carbon inside the coke particles) and oils or other lubricants to facilitate extrusion of the blend.

Also included in the blend are mesophase pitch-based carbon fibers. Such fibers are produced from pitch that has been at least partially transformed to a liquid crystal, or so-called mesophase, state. The fibers used should advantageously have a Young's modulus (after carbonization) of about $15\times10^6$ psi to about $40\times10^6$ psi. They preferably have an average diameter of about 6 to about 15 microns, a tensile strength of about $200\times10^3$ psi to about $400\times10^3$ psi, and are about ⅙ inch to about 1 inch in length on average. Most advantageously, the fibers are added to the blend as bundles containing between about 2000 and about 20,000 fibers per bundle, compacted with the use of a sizing.

As noted, the carbon fibers to be included in the blend are based on mesophase pitch. Mesophase pitch can be prepared from feedstocks such as heavy aromatic petroleum streams, ethylene cracker tars, coal derivatives, petroleum thermal tars, fluid cracker residues and pressure treated aromatic distillates having a boiling range from 340° C. to about 525° C. The production of mesophase pitch is described in, for example, U.S. Pat. No. 4,017,327 to Lewis et al., the disclosure of which is incorporated herein by reference. Typically, mesophase pitch is formed by heating the feedstock in a chemically inert atmosphere (such as nitrogen, argon, xenon, helium or the like) to a temperature of about 350° C. to 500° C. A chemically inert gas can be bubbled through the feedstock during heating to facilitate the formation of mesophase pitch. For preparation of carbon fibers, the mesophase pitch should have a softening point, that is, the point at which the mesophase pitch begins to deform, of less than 400° C. and usually less than about 350° C. If the pitch has a higher softening point, formation of carbon fibers having the desired physical properties is difficult.

Once the mesophase pitch is prepared, it is spun into filaments of the desired diameter, by known processes such as by melt spinning, centrifugal spinning, blow spinning or other processes which will be familiar to the skilled artisan. Spinning produces carbon fibers suitable for use in preparing the pin of the present invention. The filaments are then thermoset at a temperature no higher than the softening point of the pitch (but usually above 250° C.) for about 5 to 60 minutes, then further treated at extremely high temperatures, on the order of up to about 1000° C. and higher, and in some cases as high as about 3000° C. more typically about 1500° C. to 1700° C., to carbonize the fibers. The carbonization process takes place in an inert atmosphere, such as argon gas, for at least about 0.5 minutes. Most commonly, carbonization uses residence times of between about 1 and 25 minutes. The fibers are then cut to length and formed into bundles. Such fibers, bundled as described, are commercially available from BP/Amoco Company of Alpharetta, Ga. and Mitsubishi Chemical Company of Tokyo, Japan.

The carbon fibers are preferably included in the blend at a level of about 0.5 to about 6 parts by weight of carbon fibers per 100 parts by weight of calcined coke. Most preferably, the fibers are present at a level of about 1.25 to about 5 parts by weight fibers per 100 parts by weight of coke. In terms of the blend as a whole, the carbon fibers are incorporated at a level of about 1% to less than about 5% by weight.

After the blend of calcined coke, pitch binder, carbon fibers, etc. is prepared, the pin body is formed (or shaped) by extrusion though a die or molded in conventional forming molds to form what is referred to as a green pinstock. The forming, whether through extrusion or molding, is conducted at a temperature close to the softening point of the pitch, usually about 100° C. or higher. Although the die or mold can form the pin in substantially final form and size, machining of the finished pin is usually needed, at the very least to provide threads which may be required. As would be apparent, the pins are sized so as to have a diameter no greater than that of the electrodes to be joined into an electrode column. Typically, the pins have a diameter that is about 30% to about 60% of the diameter of the electrode. Thus, for electrodes whose diameter can vary between about 15 and 30 inches, the pins have a diameter of about 4.5 to about 18 inches.

After extrusion, the green pinstock is heat treated by baking at a temperature of between about 700° C. and about 1100° C., more preferably between about 800° C. and about 1000° C., to carbonize the pitch binder to solid coke, to give the pin permanency of form, high mechanical strength, good thermal conductivity, and comparatively low electrical resistance. The green pinstock is baked in the relative absence of air to avoid oxidation. Baking should be carried out at a rate of about 1° C. to about 5° C. an hour to the final temperature. After baking, the pin may be impregnated one or more times with coal tar or petroleum pitch, or other types of pitches known in the industry, to deposit additional pitch coke in any open pores of the pin. Each impregnation is then followed by an additional baking step.

After baking, the pin, referred to at this stage as carbonized pinstock, is then graphitized. Graphitization is by heat treatment at a final temperature of between about 2500° C. to about 3400° C. for a time sufficient to cause the carbon atoms in the calcined coke and pitch coke binder to transform from a poorly ordered state into the crystalline structure of graphite. Advantageously, graphitization is performed by maintaining the carbonized pinstock at a temperature of at least about 2700° C., and more advantageously at a temperature of between about 2700° C. and about 3200° C. At these high temperatures, elements other than carbon are volatilized and escape as vapors. The time required for maintenance at the graphitization temperature using the process of the present invention is no more than about 18 hours, indeed, no more than about 12 hours. Preferably, graphitization is for about 1.5 to about 8 hours.

As noted, once graphitization is completed, the finished pin can be cut to size and then machined or otherwise formed into its final configuration. Typically, the pin is tapered from the middle to either end, and then threads are machined into either end of the pin, to permit mating with corresponding threads in the ends of carbon electrodes, to form the electrode column. Given its nature, the graphite pin permits machining to a high degree of tolerance, thus permitting a strong connection between pin and electrode.

The pins prepared in accordance with the present invention exhibit a substantial reduction in longitudinal CTE as compared with pins prepared without carbon fibers. The pins show an increase in flexural strength (i.e., modulus of rupture) and an increase in Young's modulus, without a concomitant significant increase in transverse CTE or specific resistance, without the requirement of commercially disadvantageous graphitization times.

The following examples are presented to further illustrate and explain the present invention and should not be viewed as limiting in any regard. Unless otherwise indicated, all parts and percentages are by weight, and are based on the weight of the product at the particular stage in processing indicated.

EXAMPLE I

A trial was conducted using bundles of mesophase pitch-based carbon fiber designated as Grade K 223-SE obtained from Mitsubishi Chemical Company of Tokyo, Japan. The fibers had an average diameter of 10 microns, a Young's modulus of $30 \times 10^6$ psi and an average tensile strength of $340 \times 10^3$ psi. The fibers were compacted into bundles of approximately 12,000 fibers with a sizing, and chopped into ¼ inch lengths.

The fiber bundles were blended in a cylinder mixer with calcined coke particles and coal tar binder pitch. The blend contained 4.5 parts by weight of carbon fibers per 100 parts by weight of calcined coke per 32 parts by weight of pitch. About 1 part by weight of iron oxide was added to inhibit coke puffing and about 1 part by weight of oil was added as an extrusion aid. The weight percentage of fibers in the total blend was 3.2%.

The ingredients were blended for about 1 hour while heating up to about 160° C., and then extruded at about 110° C. into a 317 mm diameter pinstock. The pinstock was baked to 800° C. at a rate of 2° C./hour in an atmosphere protected from air, and then impregnated with pitch and rebaked to 800° C., followed by a second impregnation and rebake. The carbonized pinstock was then heated to about 2700° C. in a graphitization furnace and maintained above about 2700° C. for about 5 hours.

As a control, pinstock was formed in the same manner with the same ingredients and processing parameters, but without the addition of any carbon fibers.

The graphite properties obtained for the pinstock with and without fibers are summarized in Table I.

TABLE I

|  | Pinstock With Fibers (3.2%) | Pinstock Without Fibers |
| --- | --- | --- |
| Longitudinal CTE/° C. (from 30–110° C.) | $-1.8 \times 10^{-7}$ | $0.8 \times 10^{-7}$ |
| Transverse CTE/° C. (from 30–110° C.) | $18.9 \times 10^{-7}$ | $18.8 \times 10^{-7}$ |
| Flexural Strength (MPa) | 24.9 | 22.3 |

TABLE I-continued

|  | Pinstock With Fibers (3.2%) | Pinstock Without Fibers |
| --- | --- | --- |
| Young's Modulus (GPa) | 19.6 | 16.9 |
| Specific Resistance (micro-ohm-m) | 3.74 | 3.67 |
| Density (g/cc) | 1.624 | 1.650 |

As can be seen, the addition of 3.2% by weight carbon fibers led to a substantial reduction in longitudinal CTE and an increase in flexural strength with no significant adverse effect on transverse CTE or specific resistance.

EXAMPLE II

A trial was conducted using bundles of mesophase pitch-based carbon fiber designated as Thornel Carbon Fibers, Grade GPX obtained from BP/Amoco Company of Alpharetta, Ga. The fibers had an average diameter of 11 microns, a Young's modulus of $23 \times 10^6$ psi and an average tensile strength of $212 \times 10^3$ psi. The fibers were compacted into bundles of approximately 4000 fibers with a sizing, and chopped into ¼ inch lengths.

The fiber bundles were blended in a cylinder mixer with calcined coke particles and coal tar binder pitch. The blend contained 2 parts by weight of carbon fibers per 100 parts by weight of calcined coke per 32 parts by weight of pitch. About 1 part by weight of iron oxide was added to inhibit coke puffing and about 1 part by weight of oil was added as an extrusion aid. The weight percentage of fibers in the total blend was 1.5%.

The blend was blended for about 1 hour while heating up to about 160° C. and then extruded at about 110° C. into a 150 mm diameter pinstock. The pinstock was baked to 800° C. at a rate of 2° C./hour in an atmosphere protected from air, and then impregnated with pitch and rebaked to 800° C. followed by a second impregnation and rebake. The carbonized pinstock was then heated to about 3000° C. in a graphitization furnace and maintained at about 3000° C. for about 1 hour.

As a control, pinstock was formed in the same manner with the same ingredients and processing parameters, but without the addition of any carbon fibers.

The graphite properties obtained for the pinstock with and without fibers are summarized in Table II.

TABLE II

|  | Pinstock With Fibers (1.5%) Levels | Control Pinstock |
| --- | --- | --- |
| Longitudinal CTE/° C. (from 30–110° C.) | $-0.5 \times 10^{-7}$ | $0.9 \times 10^{-7}$ |
| Transverse CTE/° C. (from 30–110° C.) | $17.2 \times 10^{-7}$ | $17.7 \times 10^{-7}$ |
| Flexural Strength (psi) | 3369 | 3011 |
| Young's Modulus (psi) | 2.47 | 2.31 |
| Specific Resistance (micro-ohm-m) | 4.88 | 4.89 |
| Density (g/cc) | 1.76 | 1.78 |

It is evident that even carbon fiber levels of 1.5% by weight result in lower longitudinal and transverse CTE and increased strength of the pinstock without significantly affecting other properties.

The above description is intended to enable the person skilled in the art to practice the invention. It is not intended to detail all of the possible variations and modifications that will become apparent to the skilled worker upon reading the description. It is intended, however, that all such modifications and variations be included within the scope of the invention that is defined by the following claims. The claims are intended to cover the indicated elements and steps in any arrangement or sequence that is effective to meet the objectives intended for the invention, unless the context specifically indicates the contrary.

What is claimed is:

1. A process for preparing pins for connecting carbon electrodes, the process comprising
   (a) combining calcined coke, a liquid pitch binder and carbon fibers derived from mesophase pitch to form a pinstock blend;
   (b) extruding the pinstock blend to form a green pinstock;
   (c) baking the green pinstock to form a carbonized pinstock; and
   (d) graphitizing the carbonized pinstock by maintaining the carbonized pinstock at a temperature of at least about 2500° C. for no more than about 18 hours, to form a pin for connecting carbon electrodes.

2. The process of claim 1 herein the carbon fibers are present at a level of about 0.5 to about 5 parts by weight of carbon fibers per 100 parts by weight of calcined coke.

3. The process of claim 2 wherein the carbon fibers have a Young's modulus of no more than about $40 \times 10^6$ psi.

4. The process of claim 3 wherein the carbon fibers have a Young's modulus of about $15 \times 10^6$ psi to about $40 \times 10^6$ psi.

5. The process of claim 4 wherein the carbon fibers have an average diameter of about 6 to about 15 microns.

6. The process of claim 5 wherein the carbon fibers have a length of about 1/6 inch to about 1 inch.

7. The process of claim 1 wherein the carbon fibers are added to the pinstock blend as bundles, each bundle containing from about 2000 to about 20,000 fibers.

8. The process of claim 1 wherein the green pinstock is baked at a temperature of about 700 to about 1100° C. in an inert environment.

9. The process of claim 8 wherein the carbonized pinstock is graphitized by maintaining it at a temperature of from about 2500 to about 3400° C. for from about 1.5 hours to about 8 hours.

10. A process for preparing pins for connecting carbon electrodes, the process comprising
    (a) combining calcined coke, a liquid pitch binder and from about 0.5 to about 5 parts by weight carbon fibers derived from mesophase pitch per 100 parts by weight of calcined coke to form a pinstock blend, the carbon fibers having a Young's modulus of no greater than about $40 \times 10^6$ psi;
    (b) extruding the pinstock blend to form a green pinstock;
    (c) baking the green pinstock to form a carbonized pinstock; and
    (d) graphitizing the carbonized pinstock, to form a pin for connecting carbon electrodes.

11. The process of claim 10 wherein the carbon fibers have a Young's modulus of about $15 \times 10^6$ psi to about $40 \times 10^6$ psi.

12. The process of claim 11 wherein the carbon fibers have an average diameter of about 6 to about 15 microns.

13. The process of claim 12 wherein the carbon fibers have a length of about 1/6 inch to about 1 inch.

14. The process of claim 13 wherein the carbon fibers are added to the pinstock blend as bundles, each bundle containing from about 2000 to about 20,000 fibers.

15. The process of claim 10 wherein the green pinstock is baked at a temperature of about 700 to about 1100° C. in an inert environment.

16. The process of claim 15 wherein the carbonized pinstock is graphitized by maintaining it at a temperature of from about 2500 to about 3400° C. for from about 1.5 hours to about 8 hours.

* * * * *